(12) United States Patent
Collins et al.

(10) Patent No.: US 7,768,518 B2
(45) Date of Patent: Aug. 3, 2010

(54) ENABLING MULTIPLE INSTRUCTION STREAM/MULTIPLE DATA STREAM EXTENSIONS ON MICROPROCESSORS

(75) Inventors: Jamison Collins, San Jose, CA (US); Perry Wang, San Jose, CA (US); Bernard Lint, Mountain View, CA (US); Koichi Yamada, Los Gatos, CA (US); Asit Mallick, Santa Clara, CA (US); Richard A. Hankins, San Jose, CA (US); Gautham Chinya, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 11/528,121

(22) Filed: Sep. 27, 2006

(65) Prior Publication Data

US 2008/0077909 A1   Mar. 27, 2008

(51) Int. Cl.
*G06F 15/80* (2006.01)
(52) U.S. Cl. .................. 345/505; 345/506; 345/686; 345/11; 345/522; 345/520
(58) Field of Classification Search ................. 345/520, 345/505, 506, 522, 11, 686
See application file for complete search history.

(56) References Cited

U.S. PATENT DOCUMENTS 5,301,287 A * 4/1994 Herrell et al. .............. 711/202
6,766,515 B1 * 7/2004 Bitar et al. ................. 718/100
7,487,341 B2 * 2/2009 Wang et al. ................ 712/244
2007/0150900 A1 * 6/2007 Hankins et al. ............ 718/108
2007/0157211 A1 * 7/2007 Wang et al. ................ 719/313

OTHER PUBLICATIONS

EP PTO, "Office Action", EP Application No. 07253782.2; Office Action mailed Sep. 2, 2008; 7 pages.
Hankins, Richard A., et al., "Multiple Instruction Stream Processor", Microarchitecture Research Lab; Intel Corporation; Proceedings of the 33rd ISCA; XP-002492727; 2006; 12 pages.
CN PTO, "First Office Action", Chinese Patent Application No. 200710170154.5, mailed Jun. 26, 2009, 3 pages.
KPO, "Office Action", Korean Patent Application No. 2007-0097609; Mailed Apr. 28, 2009, 1 page.

* cited by examiner

*Primary Examiner*—Javid A Amini
(74) *Attorney, Agent, or Firm*—Blakely, Sokoloff, Taylor & Zafman LLP

(57) ABSTRACT

Embodiments described herein disclose a system for enabling emulation of a MIMD ISA extension which supports user-level sequencer management and control, and a set of privileged code executed by both operating system managed sequencers and application managed sequencers, including different sets of persistent per-CPU and per-thread data. In one embodiment, a lightweight code layer executes beneath the operating system. This code layer is invoked in response to particular monitored events, such as the need for communication between an operating system managed sequencer and an application managed sequencer. Control is transferred to this code layer, for execution of special operations, after which control returns back to originally executing code. The code layer is normally dormant and can be invoked at any time when either a user application or the operating system is executing.

15 Claims, 5 Drawing Sheets

ENABLING MULTIPLE INSTRUCTION STREAM/MULTIPLE DATA STREAM EXTENSIONS ON MICROPROCESSORS

BACKGROUND

Embodiments are in the field of computer systems, and more particularly in the field of operating system interface and control in multiprocessor systems.

The increased development of parallel processing in modern computer systems has led to the development of partitioned microprocessor architectures, such as multicore or multiprocessor systems. This, in turn, has necessitated the development of system software and applications that can exploit present multi-core microprocessor architectures. One such development has been the MIMD (Multiple Instruction stream, Multiple Data stream) model, which refers to a parallel execution model in which the processors in a multiprocessor system essentially act independently of one another. In such systems, programs or processing structures may be decomposed for parallel execution on a functional basis. For example, certain systems may employ separate sequencers or processors for operating systems and applications. Such systems may employ operating system managed sequencers (OMS) to process operating system (OS) code, and application managed sequencers (AMS) to process application code. In general OMSs can execute both OS and application code, but AMSs can only execute application code. The division of processing tasks between OS and application code allows processing to be optimized for both types of tasks. In such a system, however, accommodation must be made to ensure that the OMS and AMS sequencers detect when either one performs an act that implicates the operating system, such as a system call (e.g., opening a file, etc.), or a fault or exception.

One disadvantage associated with systems that separate application and operating system processing between dedicated AMS and OMS sequencers is that since the operating system is not aware of the AMS, it cannot always provide protection to certain objects or elements used by the system.

DETAILED DESCRIPTION

Embodiments described herein disclose a system for enabling emulation of a multiple instruction stream/multiple data stream (MIMD) extension that supports user-level sequencer management and control, and a set of privileged code executed by both operating system managed sequencers and application managed sequencers, including different sets of persistent per-CPU and per-thread data. In one embodiment, a lightweight code layer executes beneath the operating system. This code layer is invoked in response to particular monitored events, such as the need for communication between an OMS and AMS. When this occurs, control is transferred to this code layer, one or more special operations are carried out, and control returns back to whatever code was originally being executed. The code layer is normally dormant and can be invoked at any time, when either a user application or the operating system was executing. Mechanisms are included to maintain processor execution states, including control registers, and the interrupt states.

Figure 1:
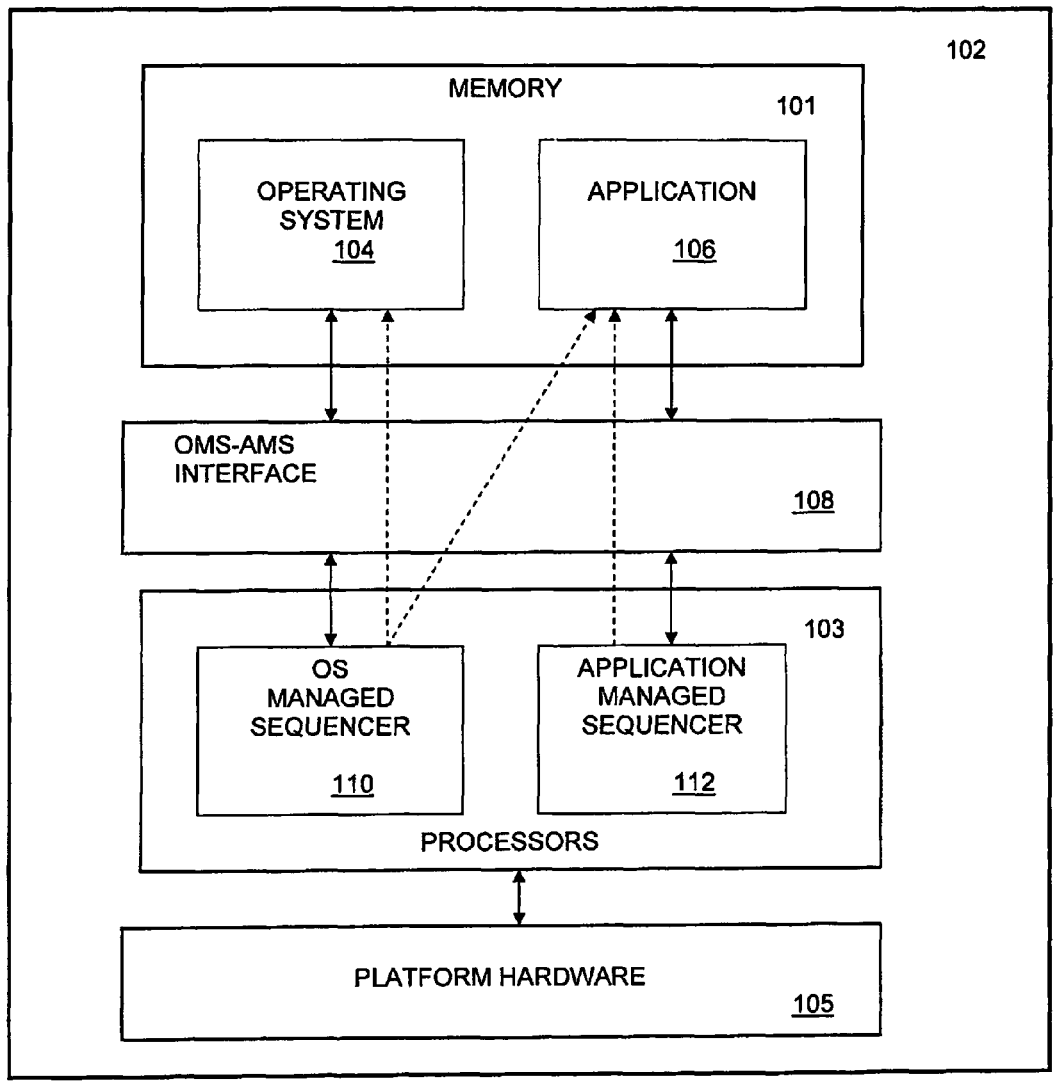
FIG. 1 is a block diagram of a computer system that implements a user-level sequencer management and control layer, under an embodiment.

Aspects of the one or more embodiments described herein may be implemented on a computer, or computers executing software instructions. The computer may be a standalone computer or it may be networked in a client-server arrangement or similar distributed computer network. FIG. 1 is a block diagram of a computer system that implements a user-level sequencer management and layer, under an embodiment.

The computer 102 of FIG. 1 represents a portion of a computer platform that includes one or more microprocessor devices or units 103 and a primary memory 101, and platform hardware devices 105. Computer 102 may be embodied on one or more motherboards, or integrated circuit devices comprising at least some of the components within platform hardware block 105. For example, platform 102 may include a memory controller, an interface controller, a bus coupling the components of the computer, as well as a number of buffers and similar circuit coupling the computer directly or indirectly to one or more on-board or off-board peripheral devices or networks. The processor or processors 103 may execute programming instructions of the platform 102, and may be single and/or multiple-core processor(s), controller(s), application specific integrated circuit(s), and so on.

The computer platform 102 of FIG. 1 includes an operating system (OS) 104 and one or more applications 106 residing in memory 101. Although illustrated as residing in a single memory device 101, it should be noted that the OS 104 and application 106 can reside in different memory within platform 102 or in memory coupled to platform 102. In general operating system 104 serves to provide an operating environment within which the application(s) 106 execute, and provides interface functionality between the applications 106 and the hardware 105 and other resources of platform 102. The application(s) 106 may comprise any number or type of different software programs or components that are executed by processors 103 to perform specific tasks or provide specific output. As used herein, the term "component" refers to programming logic and associated data that may be employed to obtain a desired outcome. It may be synonymous with "module" or "agent" and may refer to programming logic that may be embodied in hardware or firmware, or in a collection of software instructions written in a programming language, such as C, C++, Java, Intel® Architecture 32 bit (IA-32) executable code, Intel® Architecture 64 bit (IA-64) executable code, and so on.

For the embodiment illustrated in FIG. 1, platform 102 includes one or more microprocessors 103. The processors 103 include an OS managed sequencer (OMS) 110 and an application managed sequencer (AMS) 112. In general, the OMS 110 is a processor or portion of a processor 103 which processes threads for the operating system 104, as well as processes threads for the application 106; and the AMS 112 is a processor or portion of a processor 103 which processes threads for the applications 106. This functional division between the OMS and AMS is shown by the dashed arrows in FIG. 1. Unlike traditional computer systems in which all processors within the system interact with the operating system, for the embodiment of FIG. 1 each sequencer 110 and 112 utilizes private instructions and private data that are needed by their respective execution domains, i.e., OS or application. In a purely segregated system, the operating system is not aware of the presence of the AMS, since the AMS is dedicated to only executing application threads. However, this type of separation works sufficiently only when the application code and AMS activity do not implicate any operating system calls. Practically, the system needs to be able to detect when either the AMS or OMS performs an act that interacts with the operating system, such as raise an exception, open a file, or any similar type of system call.

In one embodiment, platform 102 includes a software layer 108 that resides between the sequencers 110 and 112 and the OS 104 and application 106 execution domains, and acts effectively as an OMS-AMS interface that coordinates communication between the sequencers. The software layer 108 represents a general and lightweight framework for enabling emulation of a MIMD extension that supports user-level sequencer management and control.

For an embodiment in which platform 102 is based on the Intel® Itanium™ processor or similar IA-64 architecture, the OMS-AMS interface layer 108 can be implemented as a part of the Processor Abstraction Layer (PAL). Upon entry to code layer 108, a small number of registers, such as general purpose registers and predicate registers, are saved to temporary memory space to free up some registers for use. These registers are restored at exit time from the code layer. In general, PAL maintains a consistent processor interface to the OS across multiple implementations of the Itanium Processor Family. Executing at the kernel privilege level (Ring-0), the PAL firmware essentially consists of two components: a set of service procedures which provide status and control of processor capabilities that are exposed to the OS, and an ensemble of OS-transparent hardware event handlers, which observe and respond to processor hardware events. The processor(s) 103 may include programmable debugging hardware support for the PAL layer 108 to observe and react to a wide variety of hardware events. In addition, the Itanium architecture defines a set of performance monitoring unit (PMU) interfaces to track the occurrences of numerous processor events. The PAL layer can program the PMU to count certain events and associate the respective counter overflow condition with a hardware break point event. Although embodiments may be described in relation to PAL as an implementation of the OMS-AMS interface layer 108, it should be noted that interface 108 could be any layer of firmware, microcode, VMM (virtual machine monitor), operating system support, or similar component for any microprocessor platform architecture.

In one embodiment, the PAL layer 108 is a code patch that is installed initially by loading a custom driver. This driver allocates essential memory, initializes the privileged state on the OMS 110, and brings up and initializes the remaining, OS-invisible sequencers, such as AMS 112. The driver also allocates non-paged memory to use for persistent data storage for both the OMS 110 and AMS 112. As shown in FIG. 1, platform 102 includes memory 101. There are four types of memory utilized for persistent storage, some of which is allocated per-physical CPU and is allocated by the driver and some of which is allocated per-thread and is allocated by the OS. These memory regions are as follows: (1) processor global—within each sequencer group (the OMS and its associated AMS), all sequencers share this region, and this memory is allocated by the driver; (2) processor local—private to each processor (OMS or AMS) and allocated by the driver; (3) thread global—each processor within a sequencer group has access to this state which is specific to the thread currently scheduled onto the OMS by the OS, this memory is allocated by the OS at thread creation time and destroyed at thread destruction time; and (4) thread local—private to the current processor (OMS or AMS) for data that is thread specific, this memory is allocated by the OS at thread creation time and destroyed at thread destruction time.

Driver allocated memory is allocated during PAL code path install time. These memory regions are only allocated once and persist until the driver is unloaded. Each sequencer 110 and 112 must maintain pointers to these regions. These pointers can be stored in otherwise unused registers, or the address for each pointer could be embedded in the entry code in the PAL handler, and the appropriate pointers loaded into registers based on the identifier of the sequencer entering the PAL code. Alternatively, each sequencer can have a different PAL code entry point, and the sequence of executed code can load the appropriate pointers into registers before jumping to common PAL code for sequencer management.

After initialization, all OMS and AMS sequencers 110 and 112 have installed a pointer to the sequencer global region associated with their sequencer group as well as a pointer to their private processor local memory region, and in general, these pointers remain unchanged. Thread global and thread local pointers are only valid when an application is currently scheduled to that sequencer group's OMS. Whenever a thread is context restored onto an OMS, the addresses of thread global and thread local regions is provided to the PAL code via a special command which has been inserted into the OS. The OMS 110 then communicates this information to the AMS 112 in its sequencer group.

Because accesses to these memory regions must succeed, i.e., they must not incur a fault, they should be accessed either in physical mode or, if accessed in virtual mode, have their address translation pinned into the TLB (translation lookaside buffer). This requirement can be satisfied a number of ways. During PAL install time, a large block of memory can be allocated, and a TR (translation register) installed on each processor giving a translation for this memory block. The different global and local memory regions are then given as different chunks from this large block. A second solution is to identify chunks of memory that are otherwise unused within the pinned region for the OS kernel. This pinned TR entry is then installed on each AMS.

In one embodiment, the OMS and AMS sequencers 110 and 112 invoke the PAL layer in response to a number of pre-defined events, such as: (1) execution of an instruction which must be emulated for the MIMD support; (2) receipt of an interprocessor interrupt (IPI) signal from another processor; and (3) detection of a ring transition event. When a sequencer jumps to its PAL code entry point, it inspects its state to determine the reason the code was invoked and the appropriate response. In some cases, determining this reason might require the inspection of persistent state. For example, if the PAL code is invoked as a result of the OMS returning back to from one privilege level to another privilege level (e.g., Ring-0 to Ring-3), it must be determined whether the OMS is currently handling a proxy request or not. A processor typically spends little time in its PAL code on a particular invocation, with the exception being the AMS 112 when it enters its PAUSED state, during which time it spins in a PAUSE loop inside a handler until RESUMED by an external signal.

Although the previous and following discussion may refer to specific registers, pointers, instructions and so on, it should be noted that embodiments are not limited to specific registers or microprocessor architectures, and any similar structure, component, instruction, or equivalent thereof can be used.

In one embodiment, communication between the OMS 110 and AMS 112 sequencers is implemented through the use of interprocessor interrupt (IPI) structure. Such interrupt signals could include PMI (platform management interrupts), NMI (non-maskable interrupts), and external interrupt signals. When initially powered on, the sequencers go through a number of steps in order to perform initial boot and eventually jump to an idle loop while waiting to continue being booted by the OS. In general, the AMS 112 is not initialized by the OS, thus, initial control over the AMS must be gained in order to initialize it, and can be obtained using a PMI IPI type interrupt. When a PMI IPI is received by a sequencer, it jumps to the physical address specified in a register (e.g., an XPN_PMI register), and instruction execution continues with both data and instruction accesses carried out in physical mode. Sequencers can be made to jump to different locations by changing the target address indicated in the XPN_PMI register. Alternately, the code at the default target address can be patched to instead result in a jump to the PAL code layer used for MIMD emulation. Thus, the code at the default XPN_PMI target is modified to result in a jump to code which performs the initialization of the target AMS and a PMI IPI is then sent to the AMS 112, or each AMS in the system.

Because a limited number of PMI vectors may be available, further information may be needed to differentiate the message intended by a particular IPI. A distinction between different types can be drawn by using a combination of PMI vector and memory backed message indicator (stored, for example, in the processor local region of the targeted AMS) which is also inspected when an IPI is received. Under this approach, an IPI is delivered to a sequencer on a generic IPI vector. The processor then inspects a pre-determined memory location to determine further details about the communication including message type and parameters. Optionally, if a NULL or invalid value is read from that location, the IPI can be determined to have been generated outside of the proposed framework, and that control should instead be transferred to the original, default PMI handler. There are a number of message types that could be sent between sequencers 110 and 112. Some examples include: PAUSE, RESUME, PROXY_REQUEST, SAVE_CONTEXT, RESTORE_CONTEXT, and INITIALIZE.

It is necessary that all CPL (current privilege level) transitions be captured for both the OMS 110 and AMS 112, in order to,enable proxy execution handling and to ensure correct processing by preventing the AMS 112 from continuing to execute when the OMS 110 is executing within the kernel. In general, CPL transitions comprise transitions from Ring-3 to Ring-0, and from Ring-0 to Ring-3.

In one embodiment, system 102 can utilize at least one of three possible methods of detecting and capturing transitions from Ring-3 to Ring-0. The first method comprises using an interrupt vector table (IVA) intercept, in which a sequencer transitions to Ring 0 either through a fault. When a fault occurs, the sequencer jumps to an address of the interrupt vector table that is specified in the IVA register and which consists of a distinct handler for each fault vector. To capture the ring transition from Ring-3 to Ring-0, the IVA is modified to point to a fault intercept layer installed by the driver during initialization. Therefore, whenever a fault occurs, control is first transferred to a dummy table, which performs whatever work is necessary to handle the attempted ring transition; if the AMS 112 incurs the fault, the dummy table makes a proxy request to handle the fault; if the OMS 110 incurred the fault, it first pauses all AMS processes before jumping to the real, OS-managed interrupt vector table:

The second method of detecting Ring-3 to Ring-0 transitions is through the execution of an enter privileged code (epc) instruction using an opcode match debug feature. When this instruction is opcode matched, control is transferred to the PAL code 108. If the AMS executes the epc instruction, a proxy request is made. If the OMS executed the instruction, all AMS processes are first paused, and then the OMS jumps to the kernel for OS service.

The third method of detecting Ring-3 to Ring-0 transitions is through the execution of an instruction breakpoint mechanism. For embodiments in which the OS instructions and data are located within a separate memory region, the debugging instruction breakpoint mechanism could be used to identify execution at Ring-0. An instruction breakpoint can be installed which monitors for any execution of instructions within the appropriate memory region, and triggering a control transfer to PAL code when this occurs. Alternatively, because the address translation of an OS kernel is typically pinned in a TR, monitoring for accesses which are translated by this TR could also be used. Note that this mechanism could be used, with some modification, to also identify that control has returned back to Ring-3.

Similarly, in one embodiment, system 102 can utilize at least one of three possible methods of detecting and capturing transitions from Ring-0 to Ring-3. The first method comprises using a processor status register (PSR), which contains a mixture of status and control flags, as defined in the Itanium architecture. One of the bits, namely single-step (PSR.ss) enable, when set, forces a trap following the successful execution of one instruction. This bit is normally used to enable the single-step operation by a debugger. Upon entry to the kernel, the ss-bit of the PSR is set in the interrupted Ring-3 state (IPSR). After the completion of the interrupt handling, the Ring-3 state is restored with the PSR.ss-bit previously set. The execution of one Ring-3 instruction guarantees that all interrupt handling triggered by the Ring-3 instruction has finished. Upon execution of the Ring-3 instruction, the single step trap occurs, which then redirects the trap signal to the PAL handler, thus effectively capturing the exit path of the kernel. The occurrence of the single-step fault can be detected either by intercepting the single-step fault vector via the dummy fault intercept layer, or by redirecting the single-step fault to direct control.

The second method of detecting Ring-0 to Ring-3 transitions is through the use of the PMU overflow mechanism. When an initial transition to Ring-0 is detected by the PAL layer, an available PMU can be programmed to count the occurrence of some event (e.g., retired instructions or cycles), but limiting this event to being counted only at Ring-3. When control later returns to Ring-3, this PMU will count the targeted event. When the counter overflows, control is redirected to the OMS-AMS interface layer 108, which detects that a transition back to Ring-3 has occurred. This control transfer can be enforced either by intercepting the PMU overflow vector in the IVA intercept layer, or by directing this overflow event to direct control.

The third method of detecting Ring-0 to Ring-3 transitions is through an override return address. When the initial transition to Ring-0 is detected by the PAL layer 108, the return address for this ring transition is stored in a pointer that can be saved and modified to direct control to an alternate return address. Specifically, upon execution of an appropriate instruction, control can be directed to the PAL layer. When this occurs, the ring transition is detected. Multiple return address targets might be used, depending on the nature of the ring transition.

When the OMS 112 is detected to have returned to Ring-3, if it is handling a proxy event, the end of proxy is signaled. If it was not handling a proxy, its associated AMS processes are resumed. Because the AMS 112 does not execute any OS code at Ring-0, there is no opportunity to detect that they have "returned" back to Ring-3.

Figure 2:
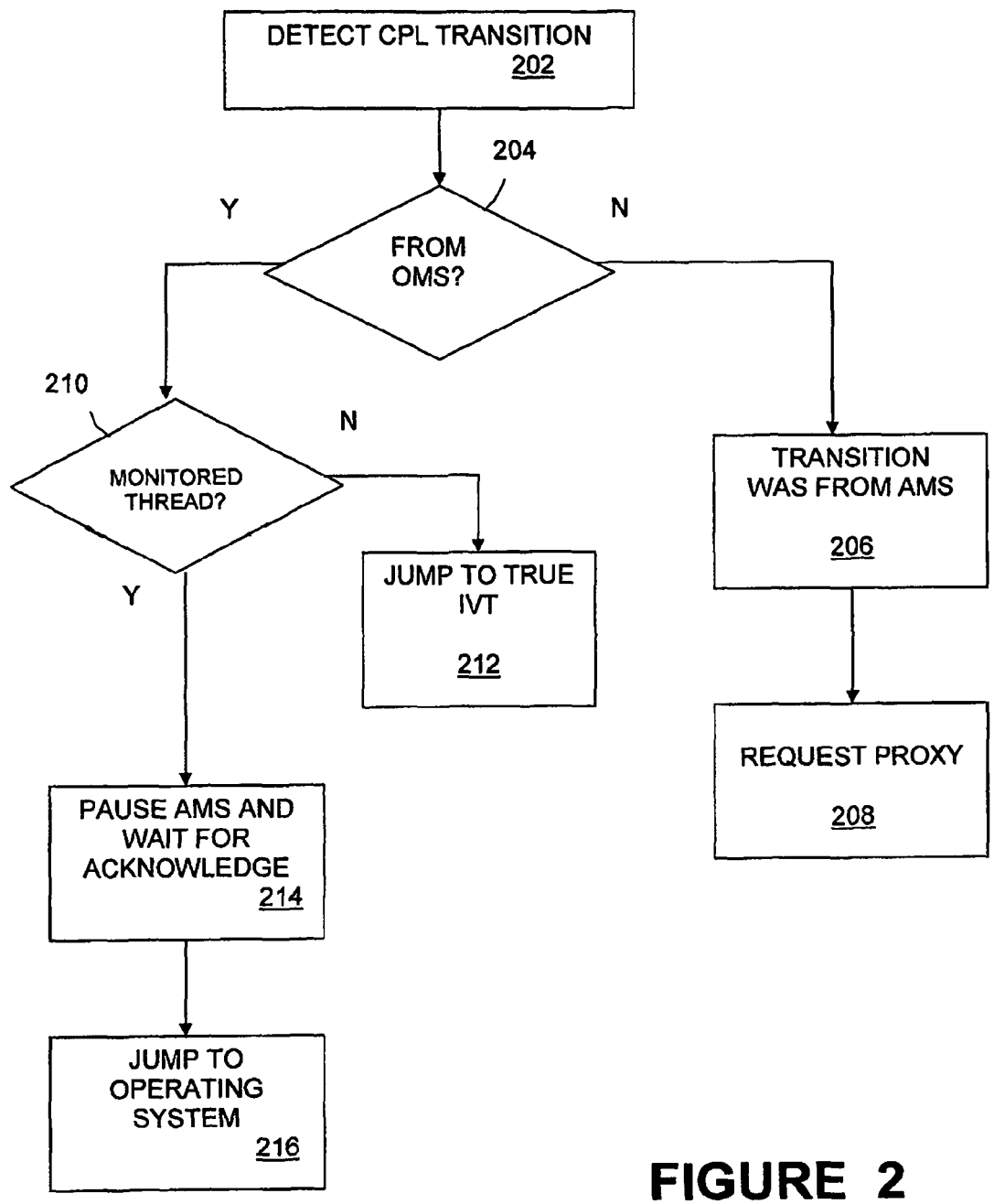
FIG. 2 is a flowchart that illustrates the overall process of detecting and processing ring transitions in an OMS-AMS interface system, under an embodiment.

FIG. 2 is a flowchart that summarizes the overall process of detecting and processing ring transitions in an OMS-AMS interface system, under an embodiment. The process begins in block 202 with the detection of a CPL transition, which can either be a Ring-3 to Ring-0 transition, or a Ring-0 to Ring-3 transition, using one of the methods described above. In block 204 it is determined whether the transition is from the OMS 110 or the AMS 112. If it is from the AMS 112, the ring transition from the AMS is detected, block 206, and then a proxy request is made, block 208. If, in block 204, it is determined that the transition is from the OMS 110, the process next determines whether the process is a monitored thread, block 210. If it is not a monitored thread, the OMS 110 jumps to the true interrupt vector table, block 212. If it is a monitored thread, the OMS pauses the AMS 112 through a pause command, or equivalent, and waits for an acknowledgement. Upon receipt of acknowledgment, the AMS jumps to the operating system, as shown in block 216.

Figure 3:
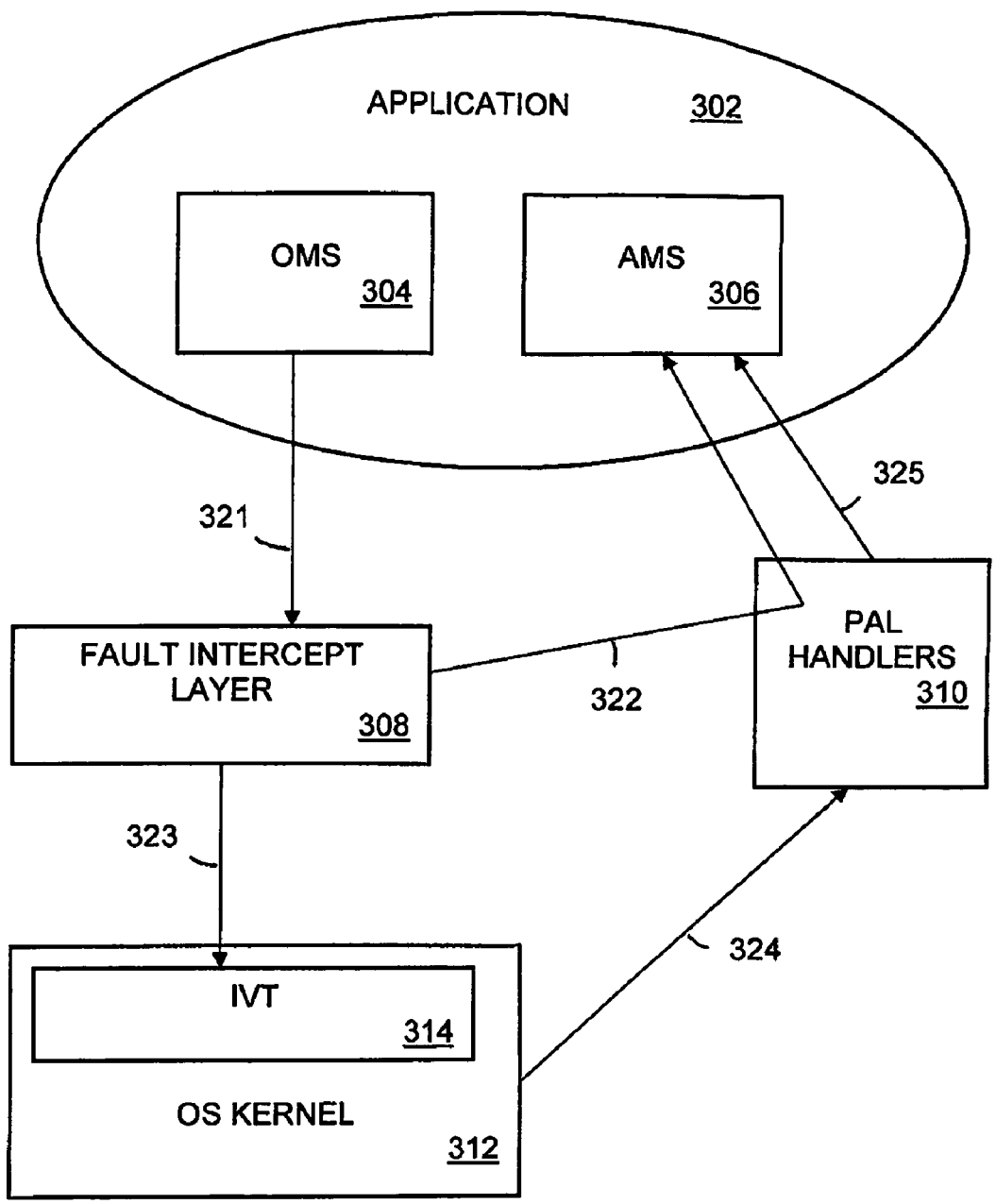
FIG. 3 is a flow diagram that illustrates a method for detecting both the Ring-0 and Ring-3 transitions associated with a fault occurring on the OMS, according to an embodiment.

As shown in FIG. 2, for cases in which a ring transition is due to the OMS, the interrupt vector table (IVT) is employed. FIG. 3 is a flow diagram that illustrates a method for detecting ring transitions associated when a fault occurs on the OMS, according to an embodiment. Instances of OMS 304 and AMS 306 are illustrated in FIG. 3 as both executing the target application 302. When the fault occurs on the OMS 304, control is immediately transferred to the target given in the IVA register. For the embodiment in which this register has been modified to point to a special fault intercept layer 308 installed by the driver during initialization, the PAL code 108 detects the attempt to transition to Ring-0, as shown by transition 321 in FIG. 3. The fault intercept layer 308 first pauses all AMS 306 processes through an invocation of PAL code handlers 310, as shown by transition 322, and then proceeds to jump to the original IVT 314 that had been installed within the OS kernel 312, as shown by transition 323. This permits the OS kernel 312 to take control and handle the fault. When finished, the OS kernel returns back to the application through AMS 306 via an appropriate instruction. By one of the above-described mechanisms, such as using the PSR.ss bit, this transition back to Ring-3 is detected, and the installed PAL code is again invoked, as shown by transition 324. The process then resumes the AMS 306, and finally returns back to the user program, allowing execution to continue, as shown in transition 325.

In one embodiment, in which the system is implemented using an IA-64 processor, such as the Itanium, a new processor instruction is defined. The new instruction, referred to as sxfr, enables an OMS to fork work to be executed on an available AMS. Such an instruction may be emulated as part of a MIMD ISA (Instruction Set Architecture) extension. A system implementing the MIMD ISA extension according to this embodiment must uniquely decode the new ISA instructions and execute them in accordance with respective architected semantics. For the Itanium architecture, the PMU mechanism provides a utility called opcode match registers, which allows the PAL to program the debug hardware to recognize and trap any special opcode encoding amid the in-flight instructions. When an in-flight instruction is found to match the opcode value specified in the opcode match registers, it gets tagged. As it moves downstream in the pipeline, the tagged instruction is further examined on whether it qualifies any back-end events. At the exception detection stage, right before retirement, the tagged instruction will trigger a hardware breakpoint event and transfer control directly to a corresponding PAL event handler, which in turn can emulate the instruction semantics.

In the Itanium architecture, the no-op (no operation) instruction is defined with a 21-bit immediate field, which can be potentially used by application software as an annotation marker. Without loss of general applicability, a no-op instruction encoding with a unique literal value is reserved to stand in place of the added instructions, and a scratch register is assigned to uniquely specify which new instruction is indicated. When the control is transferred to the PAL handler after execution of the special no-op is detected, the scratch register is read and the corresponding semantic is carried out.

Figure 4:
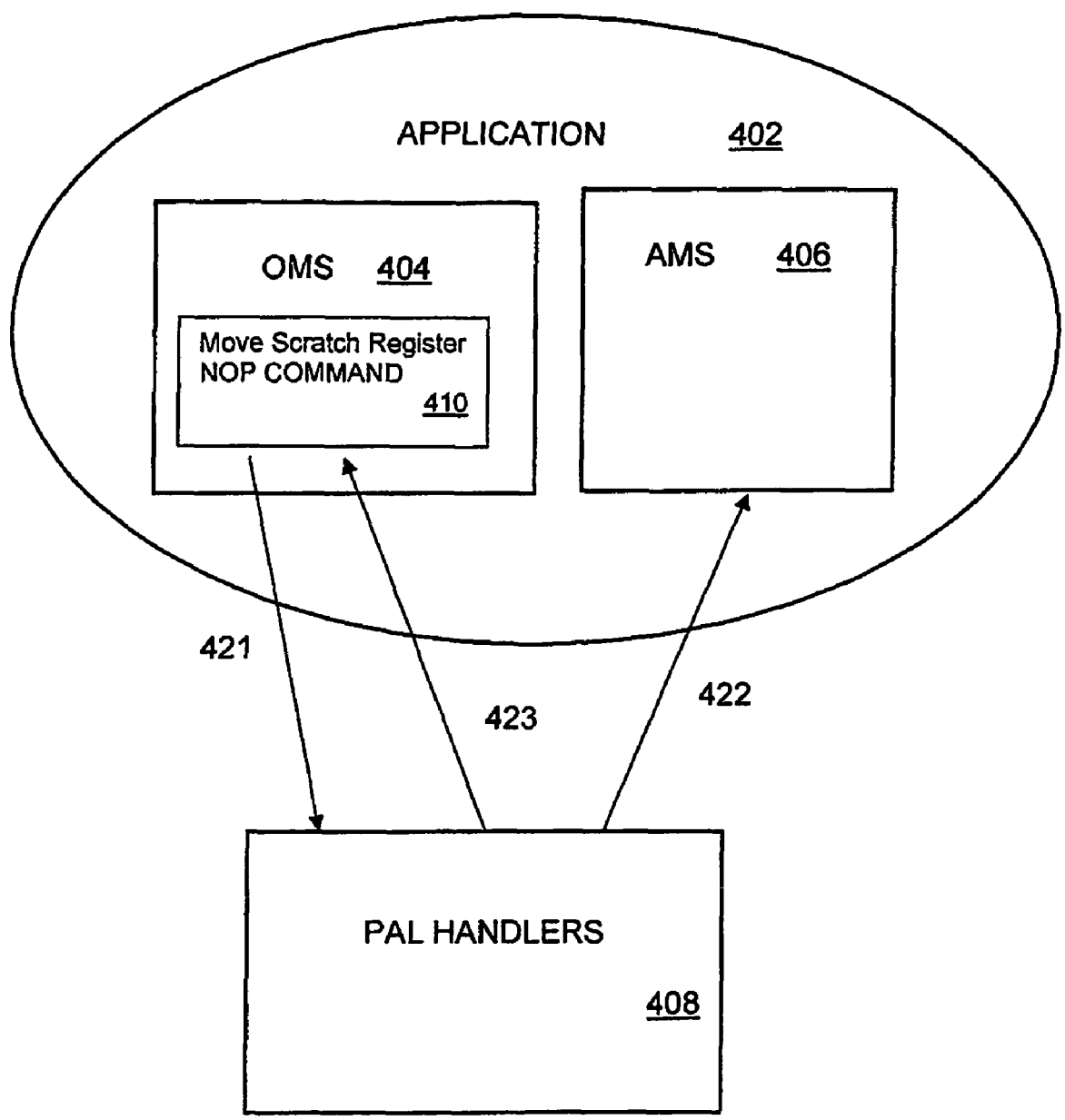
FIG. 4 is a flow diagram that illustrates a procedure to emulate a processor instruction or performing OMS-AMS interface functions, under an embodiment.

FIG. 4 is a flow diagram that illustrates a procedure to emulate a processor instruction or performing OMS-AMS interface functions, under an embodiment. As shown in FIG. 4, a shred executing on the OMS 404 triggers PAL emulation by moving the sentinel value for the SXFR command into a scratch register (e.g., r9), and then executes a special NOP command, block 410. When this occurs, a control transfer to PAL code is initiated, as shown by transition 421. The PAL code handlers 408 inspect the scratch register, determine the requested command to be emulated (SXFR), and carry out this operation by signaling the AMS 406 with the appropriate input values, as shown by transition 423. The OMS 404 then exits the PAL code 408 back to the user program, transition 422, and advances the instruction pointer to the instruction following the special NOP. The procedure for handling an IPI is carried out similarly, but the instruction pointer is not advanced prior to returning back to the user program. In an embodiment, the instruction emulation can be carried out without any operating system intervention or knowledge.

In one embodiment, the OMS-AMS interface layer 108 includes a mechanism for maintaining TLB (translation lookaside buffer) consistency between the OMS 110 and AMS 112. This adds the capability of allowing the AMS to selectively invoke OMS services. In general, a TLB is a table maintained in memory that contains information about the pages in memory that the processor has accessed recently. The TLB cross-references a program's virtual address with the corresponding absolute address in physical memory that the program has most recently used. On the Itanium Processor, translation lookaside buffers are managed by software, but with hardware support for improved performance. That is, while the operating system bears the ultimate responsible to insert TLB entries into a processor's TLB, the vast majority of TLB misses are handled automatically, in hardware, via a virtual hash page table walker (VHPT). The VHPT reduces the TLB miss penalty by first inspecting an OS-based cache of TLB entries, and, if the required entry is found, transparently inserts it into the TLB. In the case where the VHPT walker fails to automatically insert this entry, a fault is raised and the operating system installs the TLB entry.

Under this scheme, the vast majority of TLB misses that occur on an AMS are handled by the VHPT. For those which are not, a proxy execution request is triggered to handle the TLB miss. Whenever the AMS makes a proxy request of the OMS, the OMS begins opcode-matching specific instructions (e.g., itc and ptc instructions), which insert and purge TLB entries, respectively. Whenever the execution of one of these TLB instructions on the OMS is detected, they are decoded in the PAL handler and the operand values of these TLB instructions are broadcast to AMS with an IPI. Upon receipt of such an IPI, the AMS carries out the requested operation. As a result, the same TLB instruction semantic and operand values that were executed on the OMS are reproduced on the AMSs.

In general, this approach ensures correctness, but may perform poorly for workloads in which TLB miss faults are common. In fact, proxy execution is only necessary when an AMS truly requires operating system assistance to make forward progress (e.g., when it encounters a load incurring a true page fault). In one embodiment, a special software handler referred to as an Application-Safe System Call (ASC) is provided by the OS or some other Ring 0-capable piece of software, which enables an AMS to directly handle faults and system calls without needing to resort to full proxy execution.

The ASC acts as a proxy execution filter. That is, when some Ring-0 service is needed, a sequencer can first invoke the appropriate ASC to attempt to directly handle the OS service need. If successful, the proxy execution request is entirely avoided and the AMS continues execution. Otherwise an error condition is returned and execution falls back to full proxy execution. Although the ASC is described in relation to handling TLB misses, it is a general technique that can also be applied to any other frequently encountered system call or fault.

By acting as a proxy execution filter, the ASC improves performance in two ways. First, because an AMS directly handles its own OS request, minimal additional overhead is imposed. For example, the OMS is not forced to save and restore its state, nor does it need to copy and AMS state since it is entirely oblivious to the ASC execution on the AMS. Second, OS interactions which are handled by an ASC do not force a full system serialization. This makes it possible for multiple AMS to perform OS interactions simultaneously (e.g. multiple TLB misses by different AMS).

In one embodiment, the ASC mechanism is used to provide a special software TLB miss handler. This handler may be able to satisfy the vast majority of AMS TLB misses, but proxy execution is still needed in the case of a true page fault. In traditional platforms, when an AMS incurs a TLB miss, the AMS would usually immediately request proxy execution. For the embodiment in which the ASC provides a special TLB miss handler, however, the AMS instead jumps first to a specially registered software handler. This handler navigates OS-managed data structures, looking for a valid mapping for the missing page. If the handler finds such a mapping, it inserts the TLB entry into the hardware TLB, and entirely avoids any proxy execution request. If the handler is unsuccessful, such as when a true page fault has occurred, an error condition is returned and a full proxy execution request is made.

Figure 5A:
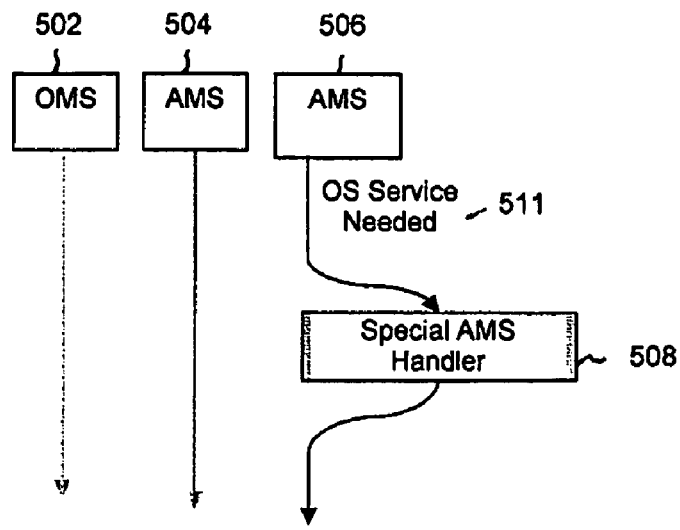
FIG. 5A illustrates a successful OS service request by an application-safe system call mechanism, according to an embodiment.
Figure 5B:
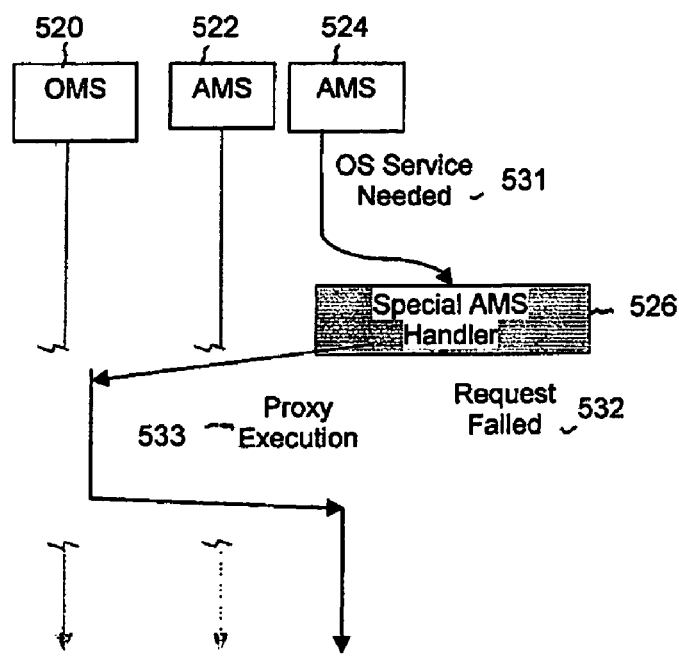
FIG. 5B illustrates a failed OS service request by an application-safe system call mechanism, according to an embodiment.

FIG. 5A illustrates a successful OS service request by an application-safe system call mechanism, according to an embodiment. For the embodiment of FIG. 5A, OMS 502 and AMS 504 execute their respective processing threads. AMS 506 issues a request 511 indicating that OS service is needed. The special AMS handler 508 processes the request by navigating the OS-managed data structures. FIG. 5A illustrates a case in which a valid mapping for the missing page is found. In certain cases, however, the request may fail. FIG. 5B illustrates a failed OS service request by an application-safe system call mechanism, according to an embodiment. For the embodiment of FIG. 5B, OMS 520 and AMS 522 execute their respective processing threads. AMS 524 issues an OS service needed request 531 to a special AMS handler 526. If the request cannot be fulfilled, the handler returns a request failed signal 532, and the AMS then performs a full proxy execution request, 533.

The ASC must generally be configured to be capable of carrying out some system request in a safe manner that can be aborted if necessary. However, different implementations for ASCs are possible. Embodiments include two mechanisms for implementing safe code for use as an ASC. First, the ASC can be implemented as a callback. In this case, before any program has been executed, ASCs are registered for each targeted event, and the address of each ASC communicated to each AMS in a system. For example, this could be done at the time that the PAL patch is installed. Alternatively, a special no-op could be used which, when executed, causes PAL code to broadcast details of the ASC to all AMS, with specific registers providing the necessary parameters to this instruction. Later during program execution when an AMS incurs a fault or makes a system call, a check is performed to see if an ASC has been registered for the particular event. If so, rather than immediately requesting proxy execution, the AMS will instead first jump to and execute the ASC. The executed ASC attempts to satisfy the AMSs OS service request, e.g., correct a fault or perform a system call. If the ASC is unable to, the system falls back to full proxy execution.

In a second embodiment, the ASC could be implemented as the default fault handler. The default fault handler within the OS could be implemented in a safe and abortable manner, such that when a fault occurs, both OMS and AMS are free to directly invoke the OS-provided fault handler. If the ASC is insufficient to resolve the fault, for example, if a TLB miss has been detected to be a true page fault, the execution of the ASC is aborted and a full proxy execution is necessary. In order to utilize this approach, some modification is made to the Ring-0 intercept code. For example, the IVT intercept layer can be modified so that, for particular vectors, control passes directly to the original OS provided IVT. Additionally, when an attempt is made to execute an epc instruction, the input registers can be parsed to determine whether a system request that is handled by an ASC is being requested. If so, the ring transition is permitted to continue without requiring a proxy request or pausing the currently active AMS.

While the above description addressed the use of ASCs to filter AMS proxy requests, they can also be used to improve performance when an OMS requires operating system service. This is advantageous because it avoids the normal system serialization required whenever the OMS transitions to Ring 0. In general, the OMS can take advantage of ASC in the same manner as AMS, that is, when an OMS incurs a TLB miss fault, the ASC is first called in an attempt to satisfy the request without pausing all AMS in the system. If the ASC call is unsuccessful, the OMS falls back to its normal approach, i.e., pausing all AMS and then jumping to the true operating system entry point.

The above embodiments describe a software layer that provides a means by which the design of processors with native (hardware-level) MIMID ISA support can be simplified using a combination of hardware and software support. The software layer comprises a set of privileged code to be executed by both OMS and AMS, including different sets of persistent per-CPU and per-thread data. It intercepts all CPL transitions that occur on both AMS and OMS, and coordinates communication between OMS and AMS, including initially bringing up and initializing AMS. It further enables high performance TLB miss handling for AMS, which avoids significant overhead from proxy execution, and for OMS, which avoids significant overhead associated with PAUSING the associated AMS Although described in relation to one or more specific processor architectures, the described embodiments are applicable to a wide range of environments. Thus, although the present embodiments have been described in connection with a preferred form of practicing them and modifications thereto, those of ordinary skill in the art will understand that many other modifications can be made within the scope of the claims that follow. Accordingly, it is not intended that the scope of the described embodiments in any way be limited by the above description, but instead be determined entirely by reference to the claims that follow.

For the purposes of the present description, the term "processor" or "CPU" refers to any machine that is capable of executing a sequence of instructions and should be taken to include, but not be limited to, general purpose microprocessors, special purpose microprocessors, application specific integrated circuits (ASICs), multi-media controllers, digital signal processors, and micro-controllers, etc.

The memory associated with the system illustrated in FIG. 1, may be embodied in a variety of different types of memory devices adapted to store digital information, such as static random access memory (SRAM), dynamic random access memory (DRAM), synchronous dynamic random access memory (SDRAM), and/or double data rate (DDR) SDRAM or DRAM, and also non-volatile memory such as read-only memory (ROM). Moreover, the memory devices may further include other storage devices such as hard disk drives, floppy disk drives, optical disk drives, etc., and appropriate interfaces. The system may include suitable interfaces to interface with I/O devices such as disk drives, monitors, keypads, a modem, a printer, or any other type of suitable I/O devices.

Aspects of the methods and systems described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Implementations may also include microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, etc.

While the term "component" is generally used herein, it is understood that "component" includes circuitry, components, modules, and/or any combination of circuitry, components, and/or modules as the terms are known in the art.

The various components and/or functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list; all of the items in the list; and any combination of the items in the list.

The above description of illustrated embodiments is not intended to be exhaustive or limited by the disclosure. While specific embodiments of, and examples for, the systems and methods are described herein for illustrative purposes, various equivalent modifications are possible, as those skilled in the relevant art will recognize. The teachings provided herein may be applied to other systems and methods, and not only for the systems and methods described above. The elements and acts of the various embodiments described above may be combined to provide further embodiments. These and other changes may be made to methods and systems in light of the above detailed description.

In general, in the following claims, the terms used should not be construed to be limited to the specific embodiments disclosed in the specification and the claims, but should be construed to include all systems and methods that operate under the claims. Accordingly, the method and systems are not limited by the disclosure, but instead the scope is to be determined entirely by the claims. While certain aspects are presented below in certain claim forms, the inventors contemplate the various aspects in any number of claim forms. Accordingly, the inventors reserve the right to add additional claims after filing the application to pursue such additional claim forms for other aspects as well.

What is claimed is:

1. A method comprising:
   detecting a condition requiring at least one of application managed sequencer and operating system managed sequencer interaction with an operating system executed in a multiprocessor system, wherein the condition comprises at least one of an interprocessor interrupt signal and a ring transition event;
   allocating memory to the operating system managed sequencer and the application managed sequencer;
   initializing a privileged state in the operating system managed sequencer;
   redirecting execution of the application managed sequencer to a kernel privilege level component including event handlers that respond to the detected condition;
   performing proxy execution handling of the detected condition if the condition was incurred by the application managed sequencer; and
   jumping to an execution location pointed to by an interrupt vector table if the condition was incurred by the operating system managed sequencer and the condition did not occur in a monitored thread.

2. The method of claim 1, wherein the allocated memory is selected from a system memory comprising processor global memory, processor local memory, thread global memory, and thread local memory.

3. The method of claim 2, further comprising:
   initializing a first pointer in the operating system managed sequencer to point to a global region associated with a first sequencer group;

initializing a second pointer in the operating system managed sequencer to point to a first processor local memory region;

initializing a first pointer in the application managed sequencer to point to a global region associated with a second sequencer group; and initializing a second pointer in the application managed sequencer to point to a global region associated with a second processor local memory region.

4. The method of claim 1, wherein the ring transition event comprises a Ring-0 to Ring-3 transition.

5. The method of claim 1, wherein the ring transition event comprises a Ring-0 to Ring-3 transition.

6. The method of claim 1, wherein the kernel privilege level component comprises a firmware layer functionally residing between at least one processor of the multiprocessor system and the operating system, and wherein the hardware event handlers are transparent to the operating system.

7. The method of claim 6 wherein the at least one processor comprises a 64-bit processor, and wherein the kernel privilege level component comprises a processor abstraction layer defined by the 64-bit processor architecture.

8. The method of claim 1, further comprising
pinning addresses of the memory allocated to to the operating system managed sequencer and the application managed sequencer in a translation lookaside buffer; and
maintaining consistency for the translation lookaside buffer utilized by both the operating system managed sequencer and the application managed sequencer via a virtual hash page table walker.

9. A system comprising:
an operating system managed sequencer to execute one or more processing threads of an operating system executed in a multiprocessor platform;
an application managed sequencer to execute one or more application programs on the multiprocessor platform;
a memory space allocated to the application managed sequencer and operating system managed sequencer to store one or more pages embodying content of the operating system and application programs; and
a firmware layer to redirect execution of the application managed sequencer to a kernel privilege level component including hardware event handlers that respond to a detected condition that requires application managed sequencer interaction with the operating system, the firmware layer to further
perform proxy execution handling of the detected condition if the condition was incurred by the application managed sequencer, and
jump to an execution location pointed to by an interrupt vector table if the condition was incurred by the operating system managed sequencer and the condition did not occur in a monitored thread,
wherein the condition comprises at least one of an interprocessor interrupt signal and a ring transition event.

10. The system of claim 9 wherein the at least one processor comprises a 64-bit processor, and wherein the firmware layer comprises a processor abstraction layer defined by the 64-bit processor architecture.

11. The system of claim 10, wherein the memory space is selected from a system memory comprising processor global memory, processor local memory, thread global memory, and thread local memory.

12. The system of claim 9, wherein the ring transition event comprises at least one of a Ring-0 to Ring-3 transition, and a Ring-3 to Ring-0 transition.

13. The system of claim 12, further comprising a translation lookaside buffer utilized by the operating system managed sequencer and the application managed sequencer, the translation lookaside buffer contents controlled through a virtual hash page table walker.

14. A machine-readable storage medium having a plurality of instructions stored thereon that, when executed by a processor in a system, performs the operations of:
detecting a condition requiring at least one of application managed sequencer and operating system managed sequencer interaction with an operating system executed in a multiprocessor system, wherein the condition comprises at least one of an interprocessor interrupt signal and a ring transition event;
allocating memory to the operating system managed sequencer and the application managed sequencer;
initializing a privileged state in the operating system managed sequencer;
redirecting execution of the application managed sequencer to a kernel privilege level component including event handlers that respond to the detected condition;
performing proxy execution handling of the detected condition if the condition was incurred by the application managed sequencer; and
jumping to an execution location pointed to by an interrupt vector table if the condition was incurred by the operating system managed sequencer and the condition did not occur in a monitored thread.

15. The machine-readable storage medium of claim 14, further comprising instructions that perform the operations of:
initializing a first pointer in the operating system managed sequencer to point to a global region associated with a first sequencer group;
initializing a second pointer in the operating system managed sequencer to point to a first processor local memory region;
initializing a first pointer in the application managed sequencer to point to a global region associated with a second sequencer group; and
initializing a second pointer in the application managed sequencer to point to a global region associated with a second processor local memory region.

* * * * *

UNITED STATES PATENT AND TRADEMARK OFFICE
CERTIFICATE OF CORRECTION

| | |
|---|---|
| PATENT NO. | : 7,768,518 B2 |
| APPLICATION NO. | : 11/528121 |
| DATED | : August 3, 2010 |
| INVENTOR(S) | : Collins et al. |

Page 1 of 1

It is certified that error appears in the above-identified patent and that said Letters Patent is hereby corrected as shown below:

In column 13, at line 13 delete, "Ring-0 to Ring-3" and insert --Ring-3 to Ring-0--.

Signed and Sealed this
Third Day of May, 2011

David J. Kappos
*Director of the United States Patent and Trademark Office*